(12) United States Patent
Nakao et al.

(10) Patent No.: US 6,838,506 B2
(45) Date of Patent: Jan. 4, 2005

(54) CATIONICALLY ELECTRODEPOSITABLE COATING MATERIAL

(75) Inventors: Fumiaki Nakao, Toyota (JP);
Katsuhisa Sugisaki, Hiratsuka (JP);
Akira Tominaga, Chigasaki (JP)

(73) Assignee: Kansai Paint, Co., Ltd., Hyogo-Ken (JP)

( * ) Notice: Subject to any disclaimer, the term of this patent is extended or adjusted under 35 U.S.C. 154(b) by 0 days.

(21) Appl. No.: 10/370,692

(22) Filed: Feb. 24, 2003

(65) Prior Publication Data

US 2003/0158318 A1 Aug. 21, 2003

Related U.S. Application Data

(63) Continuation of application No. 09/553,013, filed on Apr. 20, 2000, now abandoned.

(30) Foreign Application Priority Data

| Apr. 21, 1999 | (JP) | 11-114184 |
| Apr. 30, 1999 | (JP) | 11-123446 |
| Jun. 9, 1999 | (JP) | 11-161883 |

(51) Int. Cl.⁷ ................................................ C08L 3/22
(52) U.S. Cl. .................... 524/436; 524/437; 524/445
(58) Field of Search .............................. 524/436, 437, 524/445, 456, 444, 394, 399, 400, 424, 432, 433

(56) References Cited

U.S. PATENT DOCUMENTS

| 4,761,188 A | 8/1988 | Miyata | 148/6.2 |
| 4,954,557 A * | 9/1990 | Iwanami et al. | 524/399 |
| 5,908,912 A | 6/1999 | Kollah et al. | 528/45 |
| 5,936,013 A | 8/1999 | Feola et al. | 523/414 |
| 6,265,079 B1 | 7/2001 | Nishiguchi et al. | 428/457 |

FOREIGN PATENT DOCUMENTS

| EP | 0 282 619 | 9/1988 |
| EP | 1046684 | 10/2000 |
| JP | 60-28468 | 2/1985 |
| JP | 6-136303 | 5/1994 |
| JP | 6-192470 | 7/1994 |
| WO | 99/06493 | 2/1999 |
| WO | wo 99/38923 A1 * | 5/1999 |

OTHER PUBLICATIONS

Shinto Toryo KK, WPI World Patent Information Derwent, Derwent, GB, vol. 24, No. 94, XP002900039 (1998).

* cited by examiner

Primary Examiner—Katarzyna Wyrozebski
(74) Attorney, Agent, or Firm—Wenderoth, Lind & Ponack, L.L.P.

(57) ABSTRACT

According to the present invention, provided is a cationically electrodepositable coating material comprising a resin for a cationically electrodepositable coating material, a hydrotalcite-like solid solution having a specific composition and, if necessary, a basic bismuth compound and/or an organic acid salt thereof. Such cationically electrodepositable coating material forms a coating film which is excellent in performances such as an edge corrosion-preventive property, a throwing power, a chemical resistance and a smoothness without adding harmful substances such as lead compounds and chromium compound.

14 Claims, No Drawings

CATIONICALLY ELECTRODEPOSITABLE COATING MATERIAL

This is a continuation of Ser. No. 09/553,013, filed Apr. 20, 2000 now abandoned.

The present invention relates to a cationically electrodepositable coating material capable of forming a coating film which is excellent in a hot salt water-dipping property without adding harmful substances such as lead compounds and chromium compounds and which has good edge corrosion preventive property, throwing power, chemical resistance and smoothness.

Further, the present invention relates to a cationically electrodepositable coating material containing no harmful substances such as lead compounds and chromium compounds in which a coating film thereof is not reduced in a corrosion resistance and an adhesive property when cured at a low temperature of 150 to 160° C. and which can form a coating film excellent in a corrosion preventive property and having good edge corrosion preventive property, throwing power, chemical resistance and smoothness also when applied on a non-treated steel panel.

A cationically electrodepositable coating material forms a coating film which is excellent in a throwing power, physical properties and a corrosion resistance and therefore is widely used as an under coating material for conductive metal-made coated articles such as car bodies and electric appliances to which these performances are required.

This cationically electrodepositable coating material has so far been compounded in many cases with lead compounds and chromium compounds such as lead chromate, basic lead silicate and strontium chromate in order to improve a corrosion preventive performance of the coating film, but these compounds are very hazardous substances and have problems in use in terms of a pollution control measure. Then, it has been proposed to use non-toxic or low toxic zinc phosphate, aluminum phosphate, calcium phosphate, zinc molybdate, calcium molybdate, zinc oxide, aluminum phosphomolybdate and zinc phosphomolybdate in place of these hazardous substances to thereby improve the corrosion preventive property (for example, Japanese Patent Publication No. 7224/1991). In general, however, the coating materials compounded with them are inferior in the corrosion resistance of a coating film as compared with the electrodepositable coating materials compounded with lead compounds and chromium compound and are not satisfactory in terms of practical use.

Separately from them, indicated in Japanese Patent Application Laid-Open No. 136303/1994 is a cationically electrodepositable coating material containing natural hydrotalcite as a layer compound having a chloride ion intercalation action (basic carbonate hydrate mineral of magnesium and aluminum). However, a coating film formed from the above cationically electrodepositable coating material does not have a satisfactory corrosion resistance as well and is inferior particularly in a hot salt water-dipping resistance.

Further, inferior in a corrosion resistance is a coating film obtained by applying a cationically electrodepositable coating material which is free from a lead compound and a chromium compound on a non-treated cold-rolled steel panel which is not subjected to chemical treatment with zinc phosphate. Also, these electrodeposited coating films have to be heated usually at a temperature of about 160 to about 180° C. in order to cure them, and it is pointed out that a part in the inside of the heating furnace reaches partially a temperature of lower than 160° C. or 200° C. or higher and caused is the problem that the coating film in the part exposed to such temperatures is reduced in a corrosion resistance and an adhesive property.

The first object of the present invention is to provide a cationically electrodepositable coating material to which harmful substances such as lead compounds and chromium compound do not have to be added and which can form a coating film excellent in a hot salt water-dipping resistance and having good edge corrosion preventive property, throwing power, chemical resistance and smoothness.

The second object of the present invention is to provide a cationically electrodepositable coating material to which harmful substances such as lead compounds and chromium compound do not have to be added, in which a coating film thereof is not reduced in a corrosion resistance and an adhesive property even when cured at a low temperature of 150 to 160° C., which can form a coating film excellent in a corrosion preventive property and having good edge corrosion preventive property, throwing power, chemical resistance and smoothness also when applied on non-treated steel panel and in which the coating film is not reduced in a corrosion resistance and an adhesive property even by exposure to a high temperature of 200° C. or higher.

Other objects and characteristics of the present invention shall become apparent from the following descriptions.

It has been found in the present invention that the first object described above can be achieved by adding a specific synthetic hydrotalcite-like solid solution to a resin for a cationically electrodepositable coating material, and the present invention has come to be completed.

Thus, according to the present invention, provided is a cationically electrodepositable coating material (hereinafter referred to as "a first coating material") comprising:

(A) a resin for a cationically electrodepositable coating material and (B) a hydrotalcite-like solid solution represented by the following Formula (1):

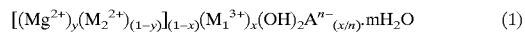

$$[(Mg^{2+})_y(M_2^{2+})_{(1-y)}]_{(1-x)}(M_1^{3+})_x(OH)_2A^{n-}_{(x/n)} \cdot mH_2O \quad (1)$$

wherein $M_2^{2+}$ represents at least one divalent metal selected from the group consisting of Zn and Ca; $M_1^{3+}$ represents at least one trivalent metal selected from the group consisting of Al and Fe; $A^{n-}$ represents a n-valent anion; and x, y and m each are integers satisfying the following condition:

$$0 < x \leq 0.5,\ 0 < y < 1,\ 0 \leq m < 2$$

Further, it has been found in the present invention that the second object described above can be achieved by further adding a specific bismuth compound as well as the specific hydrotalcite-like solid solution to the resin for a cationically electrodepositable coating material, and the present invention has come to be completed.

Thus, according to the present invention, provided is a cationically electrodepositable coating material (hereinafter referred to as "a second coating material") comprising:

(A) a resin for a cationically electrodepositable coating material, (B) a hydrotalcite-like solid solution represented by the Formula (1) described above and (C) a basic bismuth compound and/or an organic acid salt thereof.

The first and second coating materials of the present invention shall be explained below in further details.

Resin (A) for a Cationically Electrodepositable Coating Material:

In the coating material of the present invention, conventional resins for a cationically electrodepositable coating material having, per molecule, cross-linkable functional groups such as a hydroxyl group and cationizable groups can be used as the resin (A) for a cationically electrodepositable coating material, and a resin skeleton thereof may be any of an epoxy resin, an acryl resin, polybutadiene, an alkid resin and a polyester resin. In general, a polyamine resin (hereinafter referred to as an amine-added epoxy resin) prepared by adding amine to an epoxy resin is suitably used from a viewpoint of improving a corrosion resistance of the coating film.

The amine-added epoxy resin includes, for example, (i) an adduct of a polyepoxide compound to primary mono- or polyamine, secondary mono- or polyamine or primary and secondary mixed polyamine (refer to, for example, U.S. Pat. No. 3,984,299); (ii) an adduct of a polyepoxide compound to secondary mono- or polyamine having a primary amino group which is reduced to ketimine (refer to, for example, U.S. Pat. No. 4,017,438); and (iii) a reaction product obtained by etherification of a polyepoxide compound with a hydroxyl compound having a primary amino group which is reduced to ketimine (refer to, for example, Japanese Patent Application Laid-Open No. 43013/1984).

The polyepoxide compound used for producing the amine-added epoxy resin is a compound having at least two epoxy groups in a molecule and suitably a compound having a number average molecular weight falling in a range of usually at least 200, preferably 400 to 4000 and more preferably 800 to 2000 and an epoxy equivalent falling in a range of usually 100 to 4000, preferably 200 to 2000 and more preferably 400 to 1000. In particular, an aromatic polyepoxide compound obtained by reacting a polyphenol compound with epichlorohydrin is preferred. The polyphenol compound which can be used for producing the above aromatic polyepoxide compound includes, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2 propane, bis(2-hydroxynaphthyl)methane, 1,5-dihydroxynaphthalene, bis(2,4-dihydroxyphenyl) methane, tetra(4-hydroxyphenyl)-1,1,2,2-ethane, 4,4'-dihydroxydiphenylsulfone, phenol novolak and cresol novolak.

The above aromatic polyepoxide compound may be substituted partly with an aliphatic polyepoxide compound or may be those reacted partly with polyols, polyetherpolyols, polyesterpolyols, polyamideamines, polycarboxylic acids and polyisocyanate compounds. Further, it may be those graft-polymerized with ε-caprolactone and acryl monomers.

The resin for a cationically electrodepositable coating material may be either an external cross-linking type or an internal (self) cross-linking type. The external cross-linking type is used in combination with a curing agent, and conventionally known cross-linking agents such as, for example, blocked polyisocyanate compounds and amino resins can be used as the curing agent. In particular, blocked polyisocyanate compounds are preferred. On the other hand, the internal (self) cross-linking type is used for cross-linking and curing by itself without using a curing agent and includes, for example, those having an active hydrogen-containing functional group coexisting with a blocked isocyanate group in the same molecule, which are prepared by reacting partially blocked polyisocyanate compounds with a part of active hydrogen-containing functional groups contained in the resin for a cationically electrodepositable coating material.

The blocked polyisocyanate compound used in combination with the resin of an external cross-linking type for a cationically electrodepositable coating material can be a fully blocked addition reaction product of the polyisocyanate compound. The above polyisocyanate compound is a compound having at least two isocyanate groups in a molecule and includes, for example, aromatic, alicyclic or aliphatic polyisocyanate compounds such as tolylenediisocyanate, xylilenediisocyanate, phenylenediisocyanate, bis(isocyanatemethyl)-cyclohexane, tetramethylenediisocyanate, hexamethylenediisocyanate, methylenediisocyanate and isophoronediisocyanate, and terminal isocyanate group-containing prepolymers obtained by reacting excess amounts of these polyisocyanate compounds with low molecular active hydrogen-containing compounds such as ethylene glycol, propylene glycol, trimethylolpropane, hexanetriol and castor oil.

The isocyanate groups of the polyisocyanate compounds described above are blocked by adding a blocking agent, and the blocked polyisocyanate compounds formed by the addition thereof are stable at a room temperature. However, if they are heated at a higher temperature than the dissociation temperature (for example, 100° C. or higher), the blocking agent is dissociated, and the free isocyanate groups are regenerated to bridge-react with the resin for a cationically electrodepositable coating material. The blocking agent used for this purpose includes, for example, lactam base compounds such as ε-caprolactam and γ-butyrolactam; oxime base compounds such as methyl ethyl ketoxime and cyclohexanoneoxime; phenol base compounds such as phenol, p-t-butylphenol and cresol; aliphatic alcohols such as n-butanol and 2-ethylhexanol; aromatic alcohol base compounds such as phenylcarbitol and methylphenylcarbitol; and ether alcohol base compounds such as ethylene glycol monobutyl ether. Among them, the oxime base and lactam base blocking agents are dissociated at a relatively low temperature and therefore suited from a viewpoint of a low temperature curing property of the electrodepositable coating material.

With respect to a mixing proportion of the resin for a cationically electrodepositable coating material to the cross-linking agent, the resin for a cationically electrodepositable coating material falls suitably in a range of 50 to 90%, particularly 65 to 80%, and the cross-linking agent falls suitably in a range of 50 to 10%, particularly 35 to 20% each based on the total nonvolatile weight of the above both components.

A self-cross-linking type base resin prepared by providing the resin for a cationically electrodepositable coating material with a blocked isocyanate group can be prepared, for example, by reacting free isocyanate groups contained in a partially blocked polyisocyanate compound with active hydrogens contained in the above resin.

Further, these resins for a cationically electrodepositable coating material contain cationic groups capable of being cationized by neutralization treatment with an acid, such as a primary, secondary or tertiary amino group and can be solubilized or dispersed in water by neutralizing with a water-soluble organic acid such as formic acid, acetic acid and lactic acid.

Hydrotalcite-Like Solid Solution (B):

The hydrotalcite-like solid solution (B) used in the coating material of the present invention is a hydrotalcite-like solid solution represented by the following Formula (1) comprising magnesium hydroxide as a principal component, and this is effective for accelerating a curing property of the coating film and improving a corrosion resistance thereof:

$$[(Mg^{2+})_y(M_2^{2+})_{(1-y)}]_{(1-x)}(M_1^{3+})_x(OH)_2 A^{n-}_{(x/n)} \cdot mH_2O \quad (1)$$

wherein $M_2^{2+}$ represents at least one divalent metal selected from the group consisting of Zn and Ca; $M_1^{3+}$ represents at least one trivalent metal selected from the group consisting of Al and Fe; $A^{n-}$ represents a n-valent anion; and x, y and m each are integers satisfying the following condition:

$$0<x\leq 0.5,\ 0<y<1,\ 0\leq m<2$$

In the Formula (1) described above, $M_2^{2+}$ is at least one divalent metal selected from the group consisting of Zn and Ca, and among them, Zn is preferred. $M_1^{3+}$ is a trivalent metal selected from the group consisting of Al and Fe, and Al is particularly preferred. Further, in the Formula (1), $A^{n-}$ represents a n-valent anion, and $I^-$, $OH^-$, $HCO_3^-$, $CO_3^{2-}$, a salicylic acid ion and $(OOC-COO)^{2-}$ can be given as an example thereof.

In the Formula (1), x is an integer of $0<x\leq 0.5$, preferably $0.2<x\leq 0.5$ and more preferably $0.2<x\leq 0.4$; y is an integer of $0<y<1$, preferably $0.5<y\leq 1$; and m is an addition molar number of water of crystallization and is an integer of $0\leq m<2$. It is particularly preferably 0.5 or less.

The hydrotalcite-like solid solution represented by Formula (1) has the same crystalline structure as hydrotalcite $Mg_6Al_2(OH)_{16}CO_3\cdot 4H_2O$ and therefore is a compound showing an analogous powder X-ray diffraction pattern to that of the above hydrotalcite. However, the lattice constant changes according to a general rule of a solid solution. That is, the larger the solid solution amount of $M_2^{2+}$ having a larger ion radius than that of $M_g^{2+}$ grows and the larger the ion radius of $M_2^{2+}$ is, the larger the lattice constant becomes as compared with the case where $M_2^{2+}$ is Mg, that is, hydrotalcite.

It is important to turn the hydrotalcite-like solid solution of Formula (1) used in the coating material of the present invention into fine particles and sufficiently disperse them in the coating material in order to prevent substances causing filiform corrosion such as air and water from penetrating into an interface between metal panel and the coating film by improving an adhesion of the coating film to the metal surface and by carrying out more efficiently neutralization of an acidic or an alkaline corrosion circumstances. From such point of view, the hydrotalcite-like solid solution of Formula (1) has an average particle diameter falling preferably in a range of usually about 0.1 to about 2 μm and a BET specific surface area falling preferably in a range of usually about 30 $m^2/g$ or less.

Preferably used is the solid solution of Formula (1) which is treated at about 120 to about 350° C. for about one to about 40 hours in air or an inert gas environment of $N_2$ or He to remove water of crystallization to thereby make m zero or closer thereto, and the hydrotalcite-like solid solution is improved in a filiform corrosion resistance by such heating and removing-water of crystallization treatment as compared with those subjected to no such treatment.

In the coating material of the present invention, the hydrotalcite-like solid solution of Formula (1) is preferably subjected to surface treatment with a surface treating agent, in order to further improve a compatibility and a dispersibility with the resin and make it useful for improving further more the performances of the coating material of the present invention.

Higher fatty acids, anionic surfactants, silane base coupling agents, titanate base coupling agents and esters of glycerin and fatty acids can be given as examples of such surface treating agent. Specific examples of such surface treating agent include higher fatty acids such as, for example, stearic acid, oleic acid and lauric acid; anionic surfactants such as, for example, sodium stearate, sodium oleate and sodium laurylbenzenesulfonate; silane base or titanate base coupling agents such as, for example, vinyltriethoxysilane, γ-methacryloxypropyltriethoxy-silane, isopropyltriisostearoyl titanate and isopropyltridecylbenzensulfonyl titanate; and esters of glycerin and fatty acids such as, for example, glycerin monostearate and glycerin monooleate.

The surface treatment of the hydrotalcite-like solid solution of Formula (1) with the surface treating agent can be carried out, when the above surface treating agents themselves are liquid or they are made liquid by dissolving, for example, in water or alcohols, by mechanically mixing these liquid surface treating agents with the hydrotalcite-like solid solution powder of Formula (1) or a water based suspension thereof under a heating condition or a non-heating condition, or when the above surface treating agents are molten under a heating condition, the surface treatment can be carried out as well by mechanically mixing them with the hydrotalcite-like solid solution powder of Formula (1) under a heating and melting condition. After subjecting them to sufficient mixing treatment, such process as, for example, washing with water, dehydration, drying, pulverization and classification is suitably selected and carried out to obtain a surface treated article.

A use amount of the surface treating agent used in the surface treatment described above shall not strictly be restricted and can suitably be selected or changed. Usually, it falls suitably in a range of about 0.1 to about 10% by weight, particularly 1 to 10% by weight based on the weight of the hydrotalcite-like solid solution powder of Formula (1).

The hydrotalcite-like solid solution of Formula (1) can be produced by a known method, except that the component to give Mg in Formula (1) is used in combination with at least one of the components to give $M_2^{2+}$. In production processes described in, for example, Japanese Patent Publication No. 2280/1971 (U.S. Pat. Nos. 3,539,306 and 3,650,704), Japanese Patent Publication No. 32198/1972 (U.S. Pat. Nos. 3,796,792, 3,879,523 and 3,879,525), Japanese Patent Publication No. 30039/1975 (DE-A-1592126), Japanese Patent Publication No. 29477/1973 and Japanese Patent Publication No. 29129/1976, it can be produced according to the publicly known methods described above, except that the component to give $M_g^{2+}$ in Formula (1) is used in combination with at least one of the components to give $M_2^{2+}$. Further, the hydrotalcite-like solid solution of Formula (1) having a BET specific surface area of about 30 $m^2/g$ or less and an average particle diameter of about 2 μm or less can be obtained preferably by further heating the solid solution produced in the manner described above, for example, in a water base medium.

According to this embodiment, the hydrotalcite-like solid solution of Formula (1) having a desired BET specific surface area and average particle diameter can be obtained by subjecting the hydrotalcite-like solid solution of Formula (1) obtained by the method described above to heat treatment, for example, under such conditions as a temperature of about 120 to about 250° C. and a time of about 5 to about 40 hours in a water base medium in, for example, an autoclave. This heat treatment can be carried out by carrying out hydrothermal treatment under a pressurized condition, particularly preferably at a high temperature. The treating condition exceeding about 250° C. can be employed as well, but specific advantage is not expected to be obtained from it, and therefore a temperature falling in the range described above is preferably employed.

Basic Bismuth Compound and/or Organic Acid Salt (C):

The resin (A) for a cationically electrodepositable coating material is compounded with a bismuth (Bi) compound and/or organic acid salt (C) in addition to the hydrotalcite-like solid solution described above, whereby provided is the second coating material of the present invention in which the corrosion resistance and the adhesive property are good even if the electrodeposited coating film is cured at a low temperature of, for example, about 150 to about 160° C. and the coating film is not reduced in a corrosion resistance and an adhesive property even if exposed to a high temperature of 200° C. or higher and which can form a coating film improved in an edge corrosion-preventive property, a chemical resistance and a smoothness The component (C) used in the present invention is a basic bismuth compound (C-1) and/or an organic acid salt (C-2) of the above basic bismuth compound.

The basic bismuth compound (C-1) includes, for example, bismuth hydroxide, bismuth trioxide and bismuth oxycarbonate.

The organic acid salt (C-2) is a salt of the basic bismuth compound (C-1) and an organic acid. Capable of being used as this organic acid are, for example, L-lactic acid, DL-lactic acid, gallic acid, benzoic acid, succinic acid, propionic acid, acetic acid, formic acid and 2,2-dimethylolpropionic acid. In particular, suitable as the organic acid are aliphatic carboxylic acids represented by a formula $R^1C(H)(OR^2)(CH_2)_nCOOH$ (wherein $R^1$ represents a hydrogen atom or an alkyl group having 1 to 3 carbon atoms; $R^2$ represents a hydrogen atom or an alkyl group having 1 to 10 carbon atoms; and n is 0 or 1), for example, aliphatic hydroxycarboxylic acids such as hydroxy-acetic acid and hydroxypropionic acid; and alkoxycarboxylic acids such as methoxyacetic acid, ethoxyacetic acid and 3-methoxypropionic acid.

The organic acid salt (C-2) can be produced, for example, by mixing and dispersing the basic bismuth compound and the organic acid described above in a water base medium (refer to WO99/31187).

Specific examples of the organic acid salt (C-2) include bismuth (oxy) L-lactate, bismuth (oxy) DL-lactate, bismuth (oxy)gallate, bismuth (oxy)benzoate, bismuth (oxy) succinate, bismuth (oxy)-propionate, bismuth (oxy) methoxyacetate, bismuth (oxy)acetate, bismuth (oxy) formate and bismuth (oxy) 2,2-dimethylolpropionate.

In general, these compounds (C) can be used as they are or in the form of an aqueous solution or an organic solvent solution when they are powdery or liquid, and the powdery compounds (C) described above have an average particle diameter falling preferably in a range of 20 μm or less, particularly 0.1 to 10 μm.

Coating Material of the Present Invention:

The first coating material provided by the present invention comprises fundamentally the resin (A) for a cationically electrodepositable coating material and the hydrotalcite-like solid solution (B) of Formula (1) described above.

A mixing proportion of the resin (A) for a cationically electrodepositable coating material to the hydrotalcite-like solid solution (B) of Formula (1) in the first coating material of the present invention shall not strictly be restricted and can be changed over a wide range according to uses of the above coating material. In general, the hydrotalcite-like solid solution (B) falls suitably in a range of 0.1 to 20 parts by weight, particularly 1 to 10 parts by weight per 100 parts by weight (in terms of a nonvolatile) of the resin (A) for a cationically electrodepositable coating material.

The first coating material of the present invention can be prepared by mixing and dispersing the resin (A) for a cationically electrodepositable coating material and the hydrotalcite-like solid solution (B) represented by Formula (1) in a water base medium. In this case, conventional additives for a coating material such as a curing catalyst, a color pigment, an extender pigment, a corrosion preventive pigment, an organic solvent, a precipitation preventive and the like can suitably be further added, if necessary.

The second coating material provided by the present invention comprises fundamentally the resin (A) for a cationically electrodepositable coating material and the hydrotalcite-like solid solution (B) of Formula (1) described above and in addition thereto, the bismuth compound (C).

A mixing proportion of the resin (A) for a cationically electrodepositable coating material to the hydrotalcite-like solid solution (B) of Formula (1) in the second coating material of the present invention shall not strictly be restricted as well and can be changed over a wide range according to uses of the above coating material. In general, the hydrotalcite-like solid solution (B) falls suitably in a range of 0.1 to 20 parts by weight, particularly 1 to 10 parts by weight per 100 parts by weight (in terms of a nonvolatile) of the resin (A) for a cationically electrodepositable coating material.

Further, a blending amount of the bismuth compound (C) in the second coating material falls suitably in a range of usually 0.1 to 10 parts by weight, particularly 0.2 to 5 parts by weight in terms of metal Bi per 100 parts by weight (in terms of a nonvolatile) of the resin (A) for a cationically electrodepositable coating material.

The above second coating material can be prepared by mixing and dispersing the resin (A) for a cationically electrodepositable coating material, the hydrotalcite-like solid solution (B) represented by Formula (1) and the bismuth compound (C) in a water base medium. In this case, conventional additives for a coating material such as a curing catalyst, a color pigment, an extender pigment, a corrosion preventive pigment, an organic solvent, a precipitation preventive and the like can suitably be further added, if necessary.

Tin compounds and zinc compounds can be used for the curing catalyst which can suitably be compounded with the first and second coating materials of the present invention. The tin compounds include, for example, organic tin oxides such as dibutyltin oxide and dioctyltin oxide; and fatty acid or aromatic carboxylic acid salts of dialkyltin such as dibutyltin dilaurate, dioctyltin dilaurate, dibutyltin diacetate, dibutyltin dibenzoateoxy, dioctyltin dibenzoate and dibutyltin dibenzoate. A content of the tin compound in the coating material of the present invention can be changed in a wide range according to performances requested to the electrodepositable coating material, and it falls suitably in a range of usually 0 to 8 parts by weight, preferably 0.05 to 5 parts by weight in terms of metal tin per 100 parts by weight of the resin nonvolatile contained in the electrodepositable coating material. Further, the zinc compounds include, for example, zinc phosphate, zinc phosphite, zinc borate, zinc formate, zinc acetate, zinc molybdate, zinc oxide and zinc phosphomolybdate. A content of the zinc compound contained in the coating material of the present invention can be changed over a wide range according to performances requested to the electrodepositable coating material, and it falls suitably in a range of usually 0 to 8 parts by weight, preferably 0.05 to 5 parts by weight in terms of metal zinc per 100 parts by weight of the resin nonvolatile contained in the electrodepositable coating material.

The color pigment which can suitably be compounded with the first and second coating materials of the present invention includes, for example, inorganic and organic pigments such as titan white, zinc white, carbon black, molybdate orange, red iron oxide, naphthol base, pyrazolone base, benzimidazolone base, anthraquinone base, thioindigo base, perylene base, quinacridone base, titan yellow, monoazo base, disazo base, condensed azo base, anthrapyrimidine base, cobalt green, phthalocyanine green, ultramarine, cobalt blue, phthalocyanine blue and cobalt violet.

The extender pigment includes, for example, calcium carbonate, kaolin, clay, diatomaceous earth, silicic acid hydrate, talc, barite, barium sulfate, barium carbonate, silica, glass beads and mica.

The corrosion preventive pigment includes, for example, complex oxides of at least one selected from alkaline earth metals and zinc oxide with iron oxide, zinc white, zinc phosphate, zinc phosphite, calcium phosphate, aluminum phosphate, aluminum polyphosphate such as aluminum tripolyphosphate, aluminum orthophosphate, calcium orthophosphate, boric acid base corrosion preventive pigments, tangstic acid base corrosion preventive pigments, phosphorous acid base corrosion preventive pigments, hypophosphorous acid base corrosion preventive pigments, nitrous acid base corrosion preventive pigments and vanadic acid base corrosion preventive pigments.

Further, compounds such as $Zr(OH)_4 \cdot Mg_4Al_2(OH)_{12}CO_3 \cdot 3H_2O$, $Mg_6Al_2(OH)_{16}CO_3 \cdot 5H_2O$ and $Mg_6Al_7(OH)_{16}CO_3 \cdot 4H_2O$ can also be used as the corrosion preventive pigment.

In general, the color pigment, the extender pigment and the corrosion preventive pigment can be used in a powdery form and have an average particle diameter falling preferably in a range of 15 $\mu$m or less, particularly 0.01 to 5 $\mu$m. A blending amount of these pigments can optionally be selected according to the purposes and falls suitably in a range of usually 0.5 to 100 parts by weight, particularly 1 to 50 parts by weight, respectively, per 100 parts by weight (in terms of a nonvolatile) of the resin (A) for a cationically electrodepositable coating material.

The coating material of the present invention can be prepared by mixing and dispersing the resin (A) for a cationically electrodepositable coating material, the hydrotalcite-like solid solution (B) represented by Formula (1) and, if necessary, the bismuth compound (C) or other curing catalysts together with conventional additives for a coating material such as a color pigment, an extender pigment, a corrosion preventive pigment, an organic solvent, a precipitation preventive and the like in a water base medium. A mixing order of these respective components shall not specifically be restricted and, to be specific, includes methods shown below:

a) a method in which the component (B) and, if necessary, the component (C) or other curing catalysts are dispersed in an emulsion of the component (A), if necessary, together with additives for a coating material such as a pigment used and the like to prepare a water base paste, and water is further added to mix and disperse them;

b) a method in which the component (B) and, if necessary, the component (C) or other curing catalysts are dispersed in water, if necessary, together with additives for a coating material such as a pigment used and the like to prepare a slurry having a solid content of about 5 to about 20% by weight, and this is mixed with the remaining component (B), component (C), pigment and other additives for a coating material which have not been used for preparing the slurry are mixed therein (if all are used for the slurry, this step shall be omitted); then, the slurry is blended with an emulsion of the component (A), and water is further added to mix and disperse them;

c) a method in which a pigment is deposited on the particle surface of the component (B), and then it is blended with an emulsion of the component (A); and water is further added to mix and disperse them;

d) a method in which the component (B) is dispersed in an emulsion of the component (A) to which the component (C) is added, if necessary, together with additives for a coating material such as a pigment used and the like to prepare a water base paste; and water is further added to mix and disperse them;

e) a method in which the component (B) is deposited on the particle surfaces of the component (C) and/or the pigment, and then it is blended with an emulsion of the component (A); and water is further added to mix and disperse them; and f) a method in which the component (C) is deposited on the particle surfaces of the component (B) and/or the pigment, and then it is blended with an emulsion of the component (A); and water is further added to mix and disperse them.

Among them, the method c) described above is preferred as the method for preparing the first coating material, and the method f) described above is preferred as the method for preparing the second coating material.

The component (B) can be deposited (covered) on the surface of a particle-shaped pigment, for example, by dispersing the pigment in a mixed solvent of a water-soluble organic solvent such as lower alcohol having 1 to 8 carbon atoms and deionized water, mixing the component (B) homogeneously into this dispersion and then evaporating the above solvent to dryness. To be specific, the pigment is mixed into a water base dispersion (the concentration falls suitably in a range of 0.1 to 80% by weight, particularly 1 to 60% by weight) of the component (B) adjusted to a pH of 5 to 9, and the dispersion is left standing at 20 to 80° C. to allow the component (B) to be deposited and precipitated on the particle surface of the pigment. Then, it is, if necessary, classified, washing with water, refined and dried to thereby obtain the particles of the pigment covered with the component (B).

The method for depositing the pigment on the surface of the particle-shaped component (B) can be carried out in the same manner as described above.

The compound (C) can be deposited (covered) on the surfaces of the particle-shaped hydrotalcite solid solution (B) and the pigment, for example, by dispersing the solid solution (B) and/or the pigment in a mixed solvent of a water-soluble organic solvent such as lower alcohol having 1 to 8 carbon atoms and deionized water, mixing the compound (C) homogeneously into this dispersion and then evaporating the above solvent to dryness. To be specific, the solid solution (B) and/or the pigment are mixed into an aqueous solution (the concentration falls suitably in a range of 0.1 to 80% by weight, particularly 1 to 60% by weight) of the component (C) adjusted to a pH of 5 to 9, and the solution is left standing at 20 to 80° C. to allow the component (C) to be deposited and precipitated on the particle surfaces of the solid solution (B) and/or the pigment. Then, it is, if necessary, classified, washing with water, refined and dried to thereby obtain the particles of the solid solution (B) and/or the pigment covered with the compound (C).

The coating material of the present invention is diluted by adding deionized water so that the nonvolatile content falls in a range of about 5 to about 40% by weight, and the pH is controlled to a range of 5.5 to 9.0 to prepare an electrodeposition bath. A coated article is dipped therein as a cathode, and an electric current is applied under the conditions of a bath temperature of 15 to 35° C. and a loaded voltage of 100/400 V, whereby it can be electrodepositably coated. In this case, the coating film thickness falls preferably in a range of usually about 10 to about 40 μm in terms of a cured film thickness. After applying an electric current, the article is pulled up from the electrodeposition bath and washed with water. Then, the coating film is cured by heating at about 100 to about 200° C., preferably 160 to 180° C. for about 10 to about 40 minutes.

According to the first and second cationically electrodepositable coating materials of the present invention described above, a coating film which is excellent in an edge corrosion preventive property, a throwing power, a chemical resistance and a smoothness can be formed without using harmful substances such as lead compounds and chromium compounds.

Further, the first cationically electrodepositable coating material of the present invention provides a coating film which is excellent in a hot salt water-dipping property.

A coating film which is excellent in a corrosion preventive property can be formed on a non-treated steel plate by using the second cationically electrodepositable coating material of the present invention. In addition thereto, according to the second cationically electrodepositable coating material of the present invention, the corrosion resistance and the adhesive property are not reduced even if partially exposed to a high temperature of 200° C. or higher in the inside of a heating furnace for curing a coating film.

The present invention shaft more specifically be explained below with reference to examples and comparative examples, but the present invention shall not be restricted by them. Parts and percentage are based on weight unless otherwise described. The film thickness is based on the cured coating film.

Sample

1) Resin Emulsion (A) for a Cationically Electrodepositable Coating Material:

Dissolved in 1012 parts of butyl cellosolve was 1900 parts of "Epon 1004" (trade name, manufactured by Yuka Shell Co., Ltd., bisphenol A type epoxy resin, epoxy equivalent: about 950), and the solution was heated to 80 to 100° C. Then, 124 parts of diethylamine was dropwise added, and the solution was maintained at 120° C. for 2 hours to obtain an amine-added epoxy resin having an amine value of 47. Next, 1000 parts of a dimer acid type polyamide resin having an amine value of 100 ("Versamid 460", trade name, manufactured by Henkel Hakusui Corporation) was dissolved in 429 parts of methyl isobutyl ketone, and the solution was refluxed by heating at 130 to 150° C. to distil off produced water to obtain the amide resin having a terminal amino group which was reduced to ketimine. It was maintained at 150° C. for about 3 hours, and after distillation of water stopped, it was cooled down to 60° C. Then, this was added to the amine-added epoxy resin described above, and the mixture was heated to 100° C. and maintained for one hour, followed by cooling it down to a room temperature to obtain a vanish of an amine-added epoxy resin-polyamide-modified resin having a nonvolatile content of 68% and an amine value of 65.

Compounded into 103 parts (70 parts in terms of a resin nonvolatile) of this vanish were 30 parts (in terms of a nonvolatile) of a 2-ethylhexyl alcohol-blocked product of tolylenediisocyanate and 15 parts of a 10% acetic acid aqueous solution, and the solution was homogeneously mixed. Then, 150 parts of deionized water was added in about 15 minutes while strongly stirring to obtain a resin emulsion (A-a) for a cationically electrodepositable coating material having a nonvolatile content of 34%.

2) Hydrotalcite-like Solid Solution (B)

(B-a): 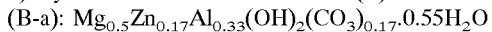 $Mg_{0.5}Zn_{0.17}Al_{0.33}(OH)_2(CO_3)_{0.17} \cdot 0.55H_2O$

Hydrotalcite-like solid solution having a particle diameter of 0.2 μm and a BET specific surface area of 15 m²/g.

(B-b): 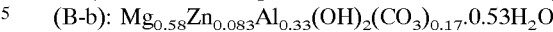 $Mg_{0.58}Zn_{0.083}Al_{0.33}(OH)_2(CO_3)_{0.17} \cdot 0.53H_2O$ Hydrotalcite-like solid solution having a particle diameter of 0.2 μm and a BET specific surface area of 15 m²/g.

3) Pigment-dispersed Past (a): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 5 parts of the hydrotalcite-like solid solution (B-a), 30 parts of titan white, one part of carbon black, 3 parts of dioctyltin oxide and 44 parts of deionized water (total 100 parts), and they were subjected to dispersion treatment in 40 hours to obtain a pigment-dispersed past (a) having a nonvolatile content of 55%.

(b): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 5 parts of the hydrotalcite-like solid solution (B-b), 30 parts of titan white, one part of carbon black, 3 parts of dioctyltin oxide and 44 parts of deionized water (total 100 parts), and they were subjected to dispersion treatment in 40 hours to obtain a pigment-dispersed past (b) having a nonvolatile content of 55%.

(c): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 5 parts of the hydrotalcite-like solid solution (B-a), one part (in terms of a metal amount) of bismuth lactate as the bismuth compound (C), 30 parts of titan white, one part of carbon black, 3 parts of dioctyltin oxide and 44 parts of deionized water (total 100 parts), and they were subjected to dispersion treatment in 40 hours to obtain a pigment-dispersed past (c) having a nonvolatile content of 55%.

(d): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 5 parts of the hydrotalcite-like solid solution (B-a), one part (in terms of a metal amount) of bismuth hydroxide as the bismuth compound (C), 30 parts of titan white, one part of carbon black, 3 parts of dioctyltin oxide and 44 parts of deionized water (total 100 parts), and they were subjected to dispersion treatment in 40 hours to obtain a pigment-dispersed past (d) having a nonvolatile content of 55%.

(e): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 5 parts of the hydrotalcite-like solid solution (B-b), one part (in terms of a metal amount) of bismuth lactate as the bismuth compound (C), 30 parts of titan white, one part of carbon black, 3 parts of dioctyltin oxide and 44 parts of deionized water (total 100 parts), and they were subjected to dispersion treatment in 40 hours to obtain a pigment-dispersed past (e) having a nonvolatile content of 55%.

(f): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 5 parts of the hydrotalcite-like solid solution (B-b), one part (in terms of a metal amount) of bismuth hydroxide as the bismuth compound (C), 30 parts of titan white, one part of carbon black, 3 parts of dioctyltin oxide and 44 parts of deionized water (total 100 parts), and they were subjected to dispersion treatment in 40 hours to obtain a pigment-dispersed past (f) having a nonvolatile content of 55%.

(g): A ball mill was charged with 17 parts of a 75% resin solution (an aqueous solution having a nonvolatile content of 75% prepared by reacting diethanolamine with a fatty acid-modified epoxy resin and neutralizing it with acetic acid), one part of acetic acid, 30 parts of titan white, one part of carbon black, 3 parts of dioctyltin oxide and 44 parts of deionized water (total 100 parts), and they were subjected to dispersion treatment in 40 hours to obtain a pigment-dispersed past (g) having a nonvolatile content of 55%.

EXAMPLES AND COMPARATIVE EXAMPLES

EXAMPLE 1

Mixed was 500 parts of the resin emulsion (A-a) for a cationically electrodepositable coating material with 100 parts of the pigment paste (a), and the solution was further diluted with deionized water to prepare a cationically electrodepositable coating material bath having a nonvolatile content of 20%.

EXAMPLE 2

Mixed was 500 parts of the resin emulsion (A-a) for a cationically electrodepositable coating material with 100 parts of the pigment paste (b), and the solution was further diluted with deionized water to prepare a cationically electrodepositable coating material bath having a nonvolatile content of 20%.

EXAMPLE 3

Mixed was 500 parts of the resin emulsion (A-a) for a cationically electrodepositable coating material with 100 parts of the pigment paste (c), and the solution was further diluted with deionized water to prepare a cationically electrodepositable coating material bath having a nonvolatile content of 20%.

EXAMPLE 4

Mixed was 500 parts of the resin emulsion (A-a) for a cationically electrodepositable coating material with 100 parts of the pigment paste (d), and the solution was further diluted with deionized water to prepare a cationically electrodepositable coating material bath having a nonvolatile content of 20%.

EXAMPLE 5

Mixed was 500 parts of the resin emulsion (A-a) for a cationically electrodepositable coating material with 100 parts of the pigment paste (e), and the solution was further diluted with deionized water to prepare a cationically electrodepositable coating material bath having a nonvolatile content of 20%.

EXAMPLE 6

Mixed was 500 parts of the resin emulsion (A-a) for a cationically electrodepositable coating material with 100 parts of the pigment paste (f), and the solution was further diluted with deionized water to prepare a cationically electrodepositable coating material bath having a nonvolatile content of 20%.

COMPARATIVE EXAMPLE

Mixed was 500 parts of the resin emulsion (A-a) for a cationically electrodepositable coating material with 100 parts of the pigment paste (g), and the solution was further diluted with deionized water to prepare a cationically electrodepositable coating material bath having a nonvolatile content of 20%.

Coating Film Performance Test Results

A cold-rolled dull steel panel (size: 0.8×150×70 mm) which was not subjected at all to conversion treatment and was degreased was immersed as a cathode in the cationically electrodepositable coating material baths obtained in the examples and the comparative examples and electrodepositably coated at a voltage of 300 V so that the film thickness became 20 $\mu$m, followed by washing with water and heating to cure the coating films. Heating was carried out at temperatures of 150° C., 170° C. and 220° C. for 20 minutes, respectively, by means of an electric hot air type drier.

The performance tests of the electrodepositably coated films thus cured were carried out in the following manners. The results thereof are shown in Table 1 and table 2. The corrosion resistances at "150° C.", "170° C." and "220° C." described in the column of Table 2 show the test results of the coating films cured at the above temperatures.

Hot Salt Water-dipping Resistance:

The coating film cured by heating at a temperature of 170° C. for 20 minutes by means of an electric hot air type drier was immersed in a 5% brine of 50° C. for 20 days, washed with water and dried. Then, a cellophane adhesive tape was adhered thereon and quickly peeled off to determine an area rate of the coating film remaining after peeling off. The mark ○ shows that the peeled area is 0 to 20%; the mark Δ shows that the peeled area is 21 to 40%; and the mark X shows that the peeled area is 41% or more.

Corrosion Resistance:

The coating films on the coated plates cured by heating at the respective temperatures were cross-cut by means of a cutter so that the cutter reached the bases and immersed in a 5% brine of 50° C. for 20 days, washed with water and dried. Then, a cellophane adhesive tape was adhered on the cut part and quickly peeled off to determine an area rate of the coating film remaining after peeling off. The mark ○ shows that the peeled area is 0 to 10%; the mark Δ shows that the peeled area is 10 to 20%; and the mark X shows that the peeled area is 20% or more.

Smoothness:

The surface of the electrodepositably coated film cured by heating at a temperature of 170° C. for 20 minutes by means of an electric hot air type drier was visually observed. The mark ○ shows that cratering and blistering are scarcely observed with a good result; the mark Δ shows that cratering and blistering are a little produced with a slightly inferior result; and the mark X shows that a lot of cratering and blistering are produced with an inferior result.

Edge Corrosion-preventive Property:

Electrodepositable coating was carried out in the same manner as described above, except that a cutter knife having an angle of about 30 degrees at a knife part was used for the coated article, and it was cured by heating at a temperature of 170° C. for 20 minutes to obtain a test coated plate. It was used for testing for 168 hours (Table 1) or 240 hours (Table 2) according to a brine spraying test method in JIS Z2371, and a degree of rust production at the edge part of about 30 degrees was visually observed. The mark ○ shows that rust production is scarcely observed with a good result; the mark Δ shows that rust is a little produced with a slightly inferior result; and the mark X shows that a lot of rust is produced with an inferior result.

Chemical Resistance (Table 1):

The test plate having a coating film which was cured by heating at a temperature of 170° C. for 20 minutes was immersed in a 10% NaOH aqueous solution at 50° C. for 10 days, pulled up, washed with water and dried. Then, the electrodepositably coated film was strongly rubbed with a gauze so as to wipe it off, and the coating film rubbed was visually evaluated. The mark ○ shows that blistering and peeling are not observed at all; the mark Δ shows that a little blistering and peeling are observed; and the mark X shows that blistering and peeling are notably observed.

Chemical Resistance (Table 2):

The test plate having a coating film which was cured by heating at a temperature of 170° C. for 20 minutes was immersed in a release agent "Neoliver" (trade name, manufactured by Kansai Paint Co., Ltd.) at 25° C. for one minute, pulled up, washed with water and dried. Then, the electrodepositably coated film was strongly rubbed with a gauze so as to wipe it off, and the coating film rubbed was visually evaluated. The mark ○ shows that 80% or more of the coating film in terms of an area remains; the mark Δ shows that 80 to 40% of the coating film in terms of an area remains; and the mark X shows that 40% or less of the coating film in terms of an area remains.

Low Temperature Curing Property:

This is a result obtained by determining a gel content of the electrodepositably coated film cured by heating at a temperature of 150° C. for 20 minutes. The test plate was dipped in acetone to carry out extraction at a refluxing temperature thereof for 5 hours to determine a residual rate (%) of the cured coating film before and after the extraction. The mark ○ shows that the cured coating film has a residual rate of 90% or more; the mark Δ shows that the cured coating film has a residual rate of 90 to 85%; and the mark X shows that the cured coating film has a residual rate of 85% or less.

Throwing Power:

Four zinc phosphate-treated steel plates having a size of 70×150×0.8×mm were prepared, and opening parts having a diameter of 8 mm were provided in the central parts of three plates out of them. The three steel plates having the opening parts were arranged at intervals of 20 mm so that they became more distant in order from an anode side, and one steel plate having no opening part was disposed in the most distance position, wherein a distance between the frontest steel plate and the anode was set to 150 mm. An anode side of the steel plate provide with opening part which was in the closest position looking from the anode side was designated as an A face, and an anode side of the steel plate provide with no opening part which was in the most distant position was designated as a G face. A thicknesses of the electrodeposited coating film on this G face was measured (BOX method). The larger this film thickness is, the better the throwing power is. The electrodepositable coating conditions were a voltage of 250 V and an electric current-applying time of 180 seconds. The coating film was cured by heating at a temperature of 170° C. for 20 minutes. The mark ○ shows that the film thickness is 10 μm or more on the G face; the mark Δ shows that the film thickness is 5 to 9 μm on the G face; and the mark X shows that the film thickness is 4 μm or less on the G face.

TABLE 1

|  | Example | | Comparative example |
|---|---|---|---|
|  | 1 | 2 | 1 |
| Hot salt water-dipping resistance | ○ | ○ | X |
| Smoothness | ○ | ○ | ○ |
| Edge corrosion-preventive property | ○ | ○ | X |
| Chemical resistance | ○ | ○ | X |
| Throwing power | ○ | ○ | Δ |

TABLE 2

|  |  | Example | | | | Comparative example |
|---|---|---|---|---|---|---|
|  |  | 3 | 4 | 5 | 6 | 1 |
| Hot salt water-dipping resistance | 150° C. | ○ | ○ | ○ | ○ | X |
|  | 170° C. | ○ | ○ | ○ | ○ | Δ |
|  | 220° C. | ○ | Δ | ○ | Δ | X |
| Smoothness |  | ○ | ○ | ○ | ○ | ○ |
| Edge corrosion-preventive property |  | ○ | ○ | ○ | ○ | X |
| Chemical resistance |  | ○ | ○ | ○ | ○ | X |
| Low temperature curing property 150° C. |  | ○ | Δ | ○ | Δ | X |
| Throwing power |  | ○ | ○ | ○ | ○ | X |

What is claimed is:

1. A cationically electrodepositable coating material comprising:
   (A) a resin for a cationically electrodepositable coating material and
   (B) a hydrotalcite solid solution represented by the following Formula (1):

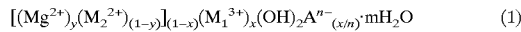

$$[(Mg^{2+})_y(M_2^{2+})_{(1-y)}]_{(1-x)}(M_1^{3+})_x(OH)_2 A^{n-}{}_{(x/n)} \cdot mH_2O \quad (1)$$

wherein $M_2^{2+}$ represents at least one divalent metal selected from the group consisting of Zn and Ca; $M_1^{3+}$ represents at least one trivalent metal selected from the group consisting of Al and Fe; $A^{n-}$ represents a n-valent anion; and x, y and m each are integers satisfying the following condition:

$$0 < x \leq 0.5, \ 0 < y < 1, \ 0 \leq m < 2 \text{ and}$$

(C) a basic bismuth compound and/or an organic acid salt thereof.

2. The coating material as described in claim 1, wherein $M_2^{2+}$ in Formula (1) is Zn.

3. The coating material as described in claim 1, wherein $M^{3+}$ in Formula (1) is Al.

4. The coating material as described in claim 1, wherein $A^{n-}$ in Formula (1) represents an anion selected from the group consist g of $I^-$, $OH^-$, $HCO^{3-}$, $CO_3^{2-}$, a salicylic acid ion and $(OOC—COO)^{2-}$.

5. The coating material as described in claim 1, wherein $0.2 < x \leq 0.5$ in Formula (1).

6. The coating material as described in claim 1, wherein $0.5 \leq y < 1$ in Formula (1).

7. The coating material as described in claim 1, wherein m is 0.5 or less in Formula (1).

8. The coating material as described in claim 1, wherein the basic bismuth compound (C) is selected from the group consisting of bismuth hydroxide, bismuth trioxide and bismuth oxycarbonate.

9. The coating material as described in claim 1, wherein the organic acid salt (C) of the basic bismuth compound is a salt of the basic bismuth compound and an organic acid selected from the group consisting of L-lactic acid, DL-lactic acid, gallic acid, benzoic acid, succinic acid, propionic acid, methoxyacetic acid, acetic acid, formic acid, 2,2-dimethylolpropionic acid and an aliphatic carboxylic acid represented by a formula $R^1C(H)(OR^2)CH_2)_nCOOH$ (wherein $R^1$ represents a hydrogen atom or an alkyl group having 1 to 3 carbon atoms; $R^2$ represents a hydrogen atom or an alkyl group having 1 to 3 carbon atoms; $R^2$ represents a hydrogen atom or an alkyl group having 1 to 10 carbon atoms; and n is 0 or 1).

10. The coating material as described in claim 1, wherein the organic acid is L-lactic acid, DL-lactic acid or methoxyacetic acid.

11. The coating material as described in claim 1, wherein the organic acid salt (C) is at least one selected from bismuth (oxy)L-lactate, bismuth (oxy)DL-lactate, bismuth(oxy) gallate, bismuth (oxy)benzoate, bismuth(oxy)succinate, bismuth(oxy)propionate, bismuth(oxy)methoxyacetate, bismuth(oxy)acetate, bismuth(oxy)formate and bismuth (oxy)2,2-dimethylolpropionate.

12. The coating material as described in claim 1, comprising the hydrotalcite solid solution (B) failing in a range of 1 to 10 parts by eight per 100 parts by weight (in terms of a nonvolatile) of the resin (A) for a cationically electrodepositable coating material.

13. The coating material as described in claim 1, comprising the basic bismuth compound and/or organic acid salt thereof (C) falling in a range of 0.1 to 10 parts by weight in terms of Bi metal per 100 parts by weight (in terms of a nonvolatile) of the resin (A) for a cationically electrodepositable coating material.

14. An article coated with the cationically electrodepositable coating material as described in claim 1.

* * * * *